Sept. 29, 1970  R. E. KUBA  3,531,708
INTEGRAL STRUCTURE THREE-PHASE FERRORESONANT TRANSFORMER
Filed Oct. 7, 1968  7 Sheets-Sheet 1

INVENTOR
RICHARD E. KUBA

BY *Brown Jackson Boettcher & Dienner*
ATTORNEY

Sept. 29, 1970          R. E. KUBA          3,531,708

INTEGRAL STRUCTURE THREE-PHASE FERRORESONANT TRANSFORMER

Filed Oct. 7, 1968          7 Sheets-Sheet 2

INVENTOR
RICHARD E. KUBA

BY
ATTORNEY

United States Patent Office 3,531,708
Patented Sept. 29, 1970

3,531,708
INTEGRAL STRUCTURE THREE-PHASE FERRORESONANT TRANSFORMER
Richard E. Kuba, Kingston, N.Y., assignor to North Electric Company, Galion, Ohio, a corporation of Ohio
Filed Oct. 7, 1968, Ser. No. 765,581
Int. Cl. H02m 7/00
U.S. Cl. 321—5                                                                                                            16 Claims

ABSTRACT OF THE DISCLOSURE

An integral magnetic core structure for use in supplying regulated output voltages which allows three ferroresonant actions to take place in the integral structure independently of each other as energized from a three-phase source. Identical magnetic paths are used in a sharing mode for the magnetic fluxes of two or more phases of the three phases which energize the transformer.

BACKGROUND OF THE INVENTION

It is the practice in some fields, as for example, in the computer field, to provide regulation for equipment energized by a three phase source by means of three single phase ferro-transformers. In addition to the large bulk of the resultant power supply and the correspondingly high cost, such equipment has inherent limitations in the regulation which can be provided. There is a need, therefore, for an improved pre-regulating transformer which may be used to supply direct current bulk voltage for series regulators and converters. Such unit would also have use and application as a three-phase alternating current line regulator.

SUMMARY OF INVENTION

An object of the invention is to provide a single core, three-phase, ferroresonant transformer structure in which three ferroresonant actions take place independently of each other, and which can be constructed with the use of standard E, I laminations which are commercially available from different sources.

Identical magnetic paths are shared by magnetic fluxes of two or more phases of the three phases which are present in the transformer while yet maintaining electrical characteristics in the one-piece structure, which, as far as its input and output terminals are concerned, are very similar to the input-output terminal characteristics of three separate and distinct ferroresonant transformers employed under the same conditions of input voltage and output load.

The novel structure for providing such object basically comprises an integral three-phase ferroresonant transformer having a magnetic core of a rectangular configuration, including a first and a second vertical side leg, an upper transverse leg, a lower transverse leg, a vertical center leg, a transverse center leg, a first primary winding and a first secondary winding located on the portion of said vertical center leg which is above said transverse center leg, a second primary winding and a second secondary winding located on the portion of said first vertical side leg below said transverse center leg, a third primary winding and a third secondary winding located on the portion of said second vertical side leg below said transverse center leg, and a first shunt member located between said first primary winding and said first secondary winding, a second shunt member located between said second primary winding and said second secondary winding, and a third shunt member located between said third primary winding and said third secondary winding.

A further object of the invention is to provide a structure of such type which is of a reduced volume and in which the cross-sectional overall magnetic paths of the structure are relatively small.

It is another object of the invention to provide a lamination structure of the cruciform type which is operative in such manner and which can be assembled without having to be laminated in the usual manner.

BRIEF DESCRIPTION OF THE INVENTION

Figure 1:
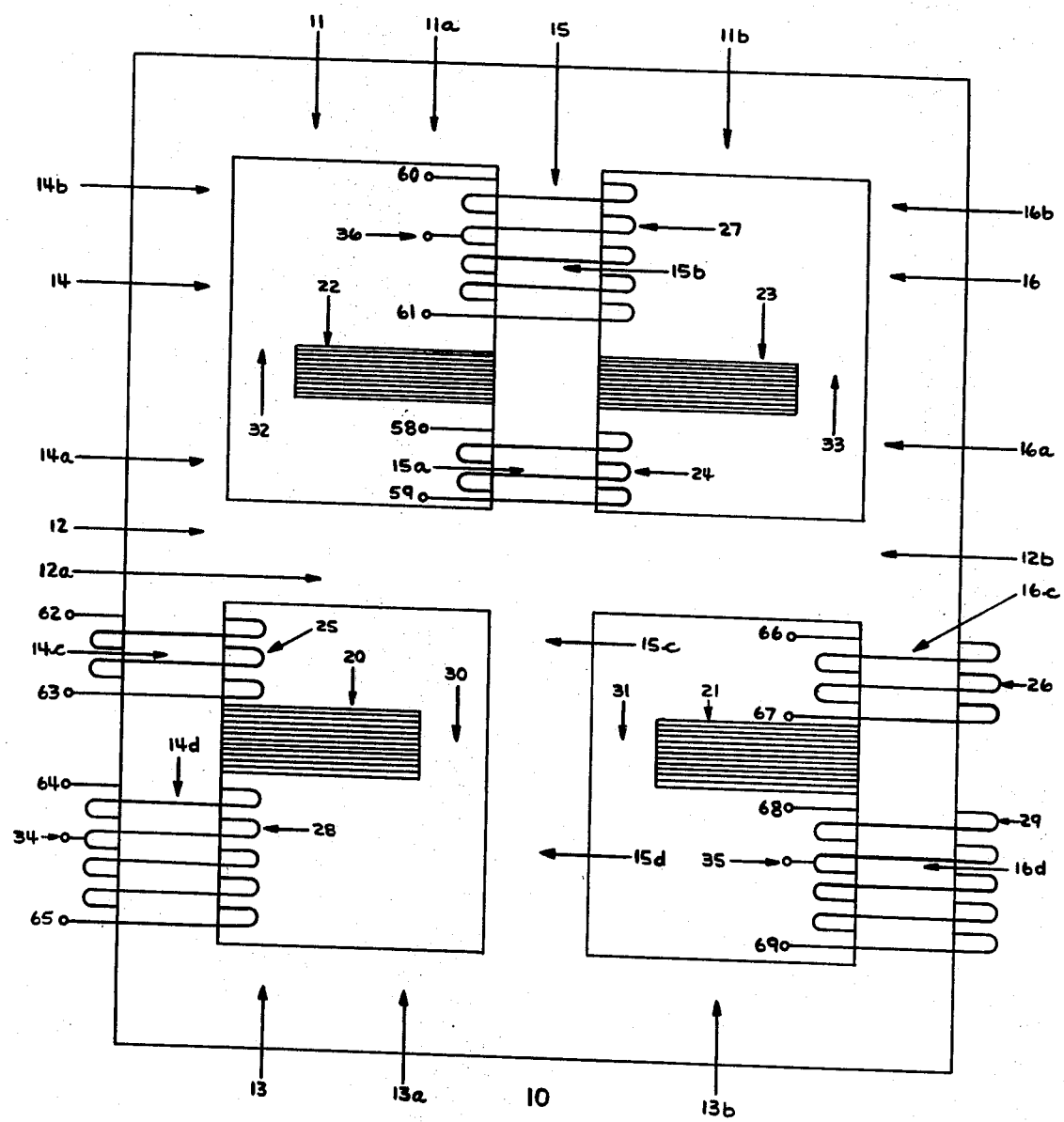
Figure 1A:
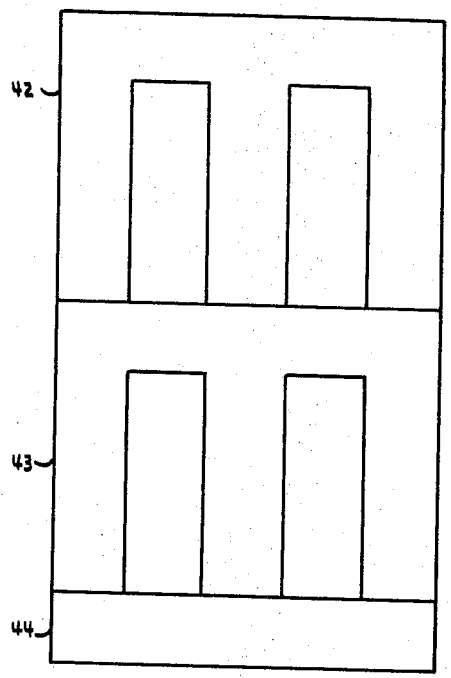
Figure 1A:
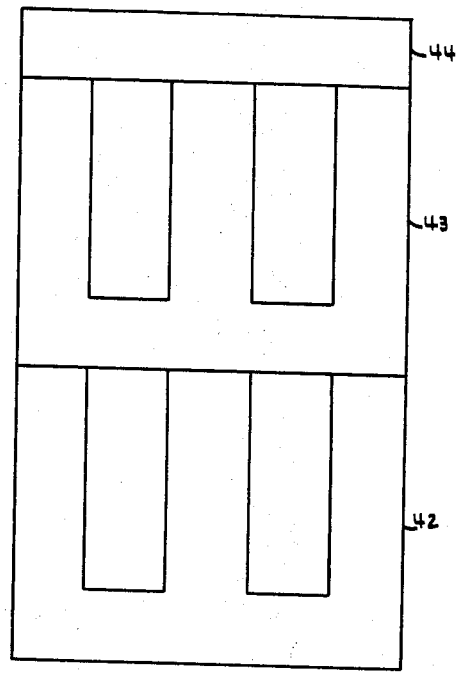
Figure 1B:
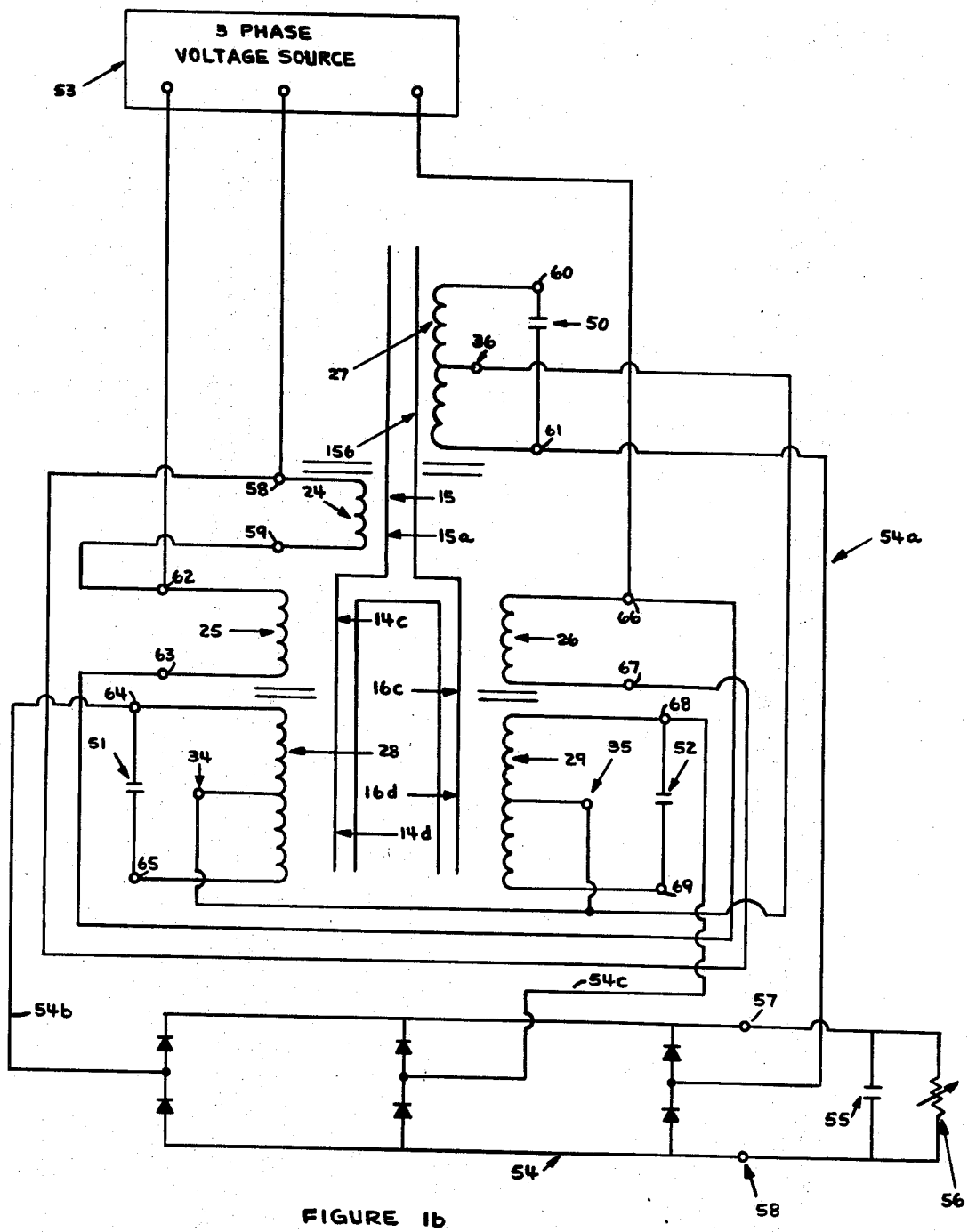
Figure 2A:
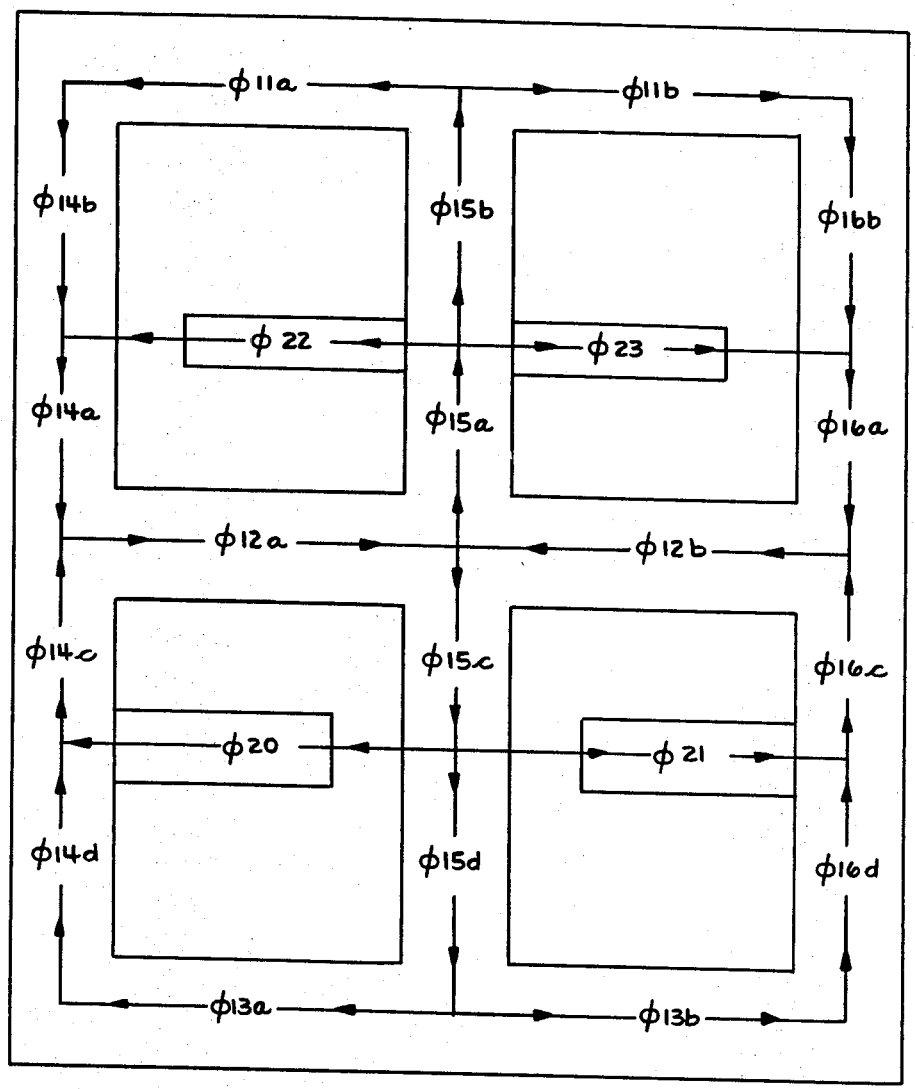
Figure 2B:
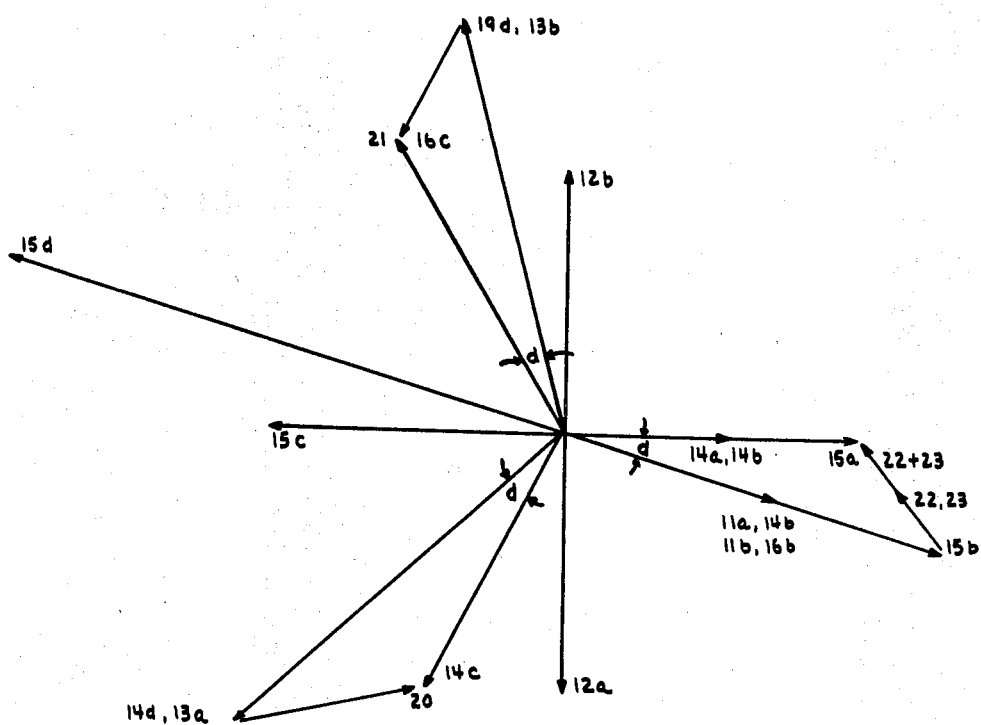
Figure 2C:
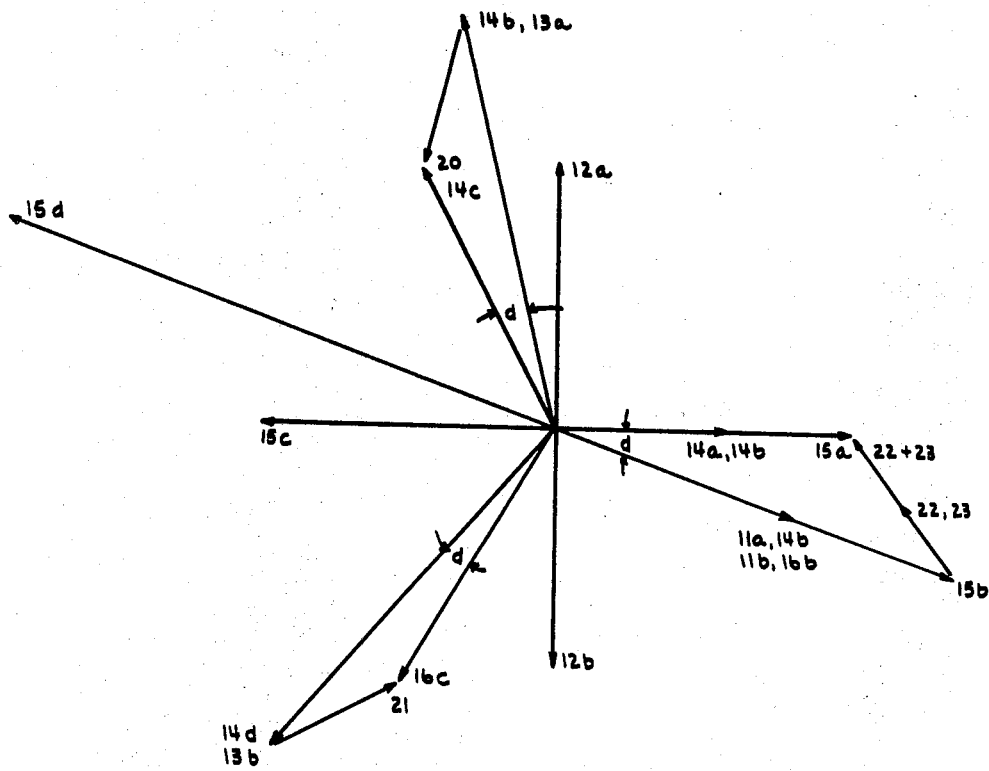
Figure 3:
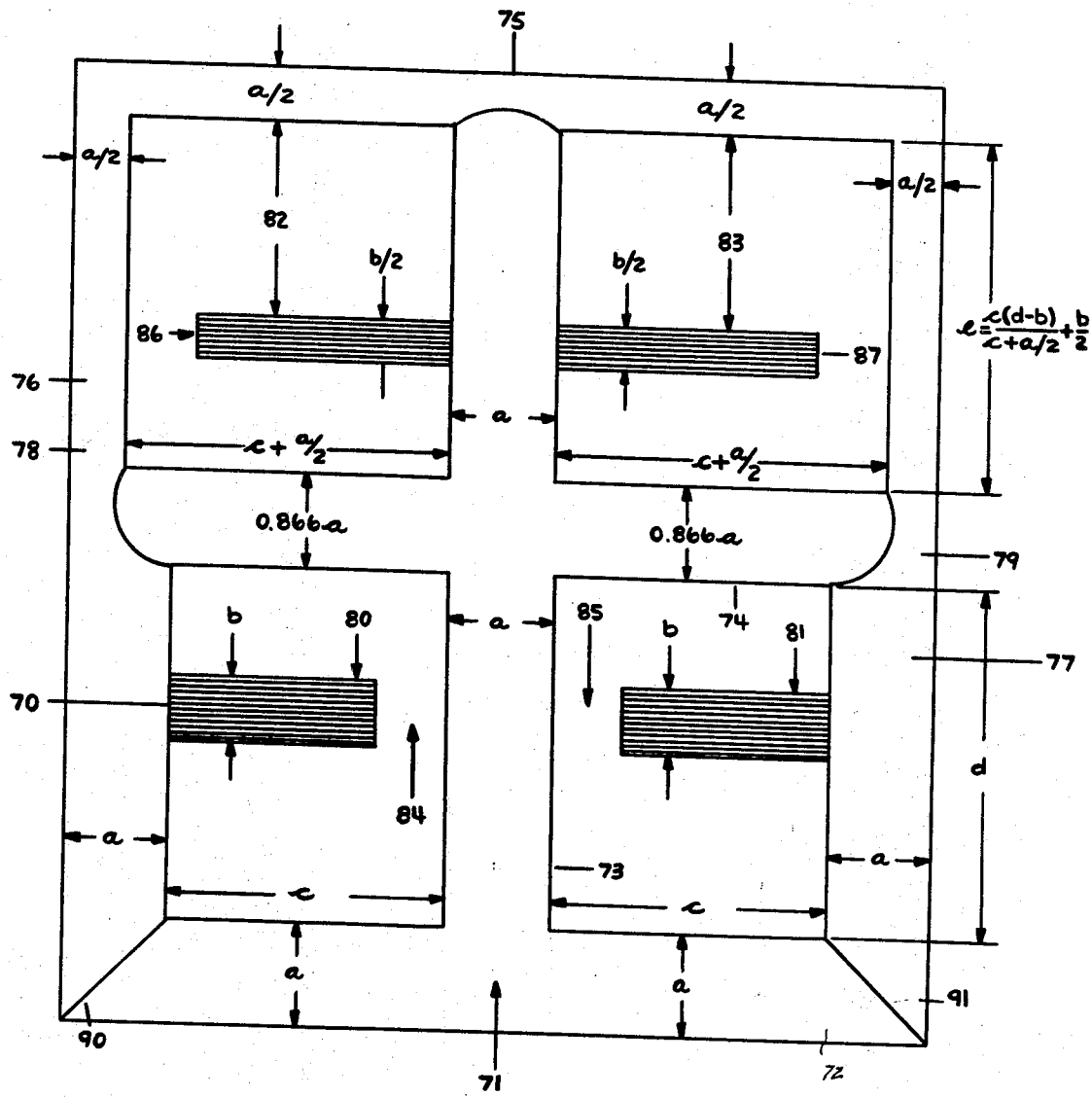

FIG. 1 illustrates a preferred construction of the integral three-phase ferroresonant transformer;
FIG. 1a shows the method of laminating the core of the transformer shown in FIG. 1 using standard E, I laminations;
FIG. 1b shows a schematic representation of the transformer of FIG. 1 in which is shown a representative connection for the input and output windings to achieve a regulated D.C. output voltage from a three-phase A.C. input line voltage;
FIG. 2a illustrates the magnetic fluxes in the various portions of the magnetic structure of FIG. 1;
FIG. 2b is a vector diagram illustrating the magnetic fluxes in the various magnetic paths of the structure of FIG. 1 for a positive phase sequence of input voltages;
FIG. 2c is a vector diagram illustrating the magnetic fluxes for a negative phase sequence of input voltages; and
FIG. 3 illustrates an embodiment of the invention in which a cruciform type construction is used and in which the cross-sectional areas of all magnetic paths as well as window areas are minimized.

DESCRIPTION OF PREFERRED EMBODIMENTS

Referring to FIG. 1, there is shown thereat a magnetic core structure 10 which core may be made of E-shaped and I-shaped interleaved laminations as more fully described hereinafter which, as assembled, provide a structure having an outer rectangular configuration comprised of first and second vertical side legs 14, 16, an upper transverse leg 11 and a lower transverse leg 13, a vertical center leg 15 extending between upper and lower legs 11 and 13, and a transverse center leg 12 extending between vertical side legs 14 and 16. First and second shunt members 22, 23 comprised of I-shaped laminations are butt joined to the portion 15a, 15b of the vertical center leg 15 which is located above transverse center leg 12. The laminations of shunt members 22, 23 are assembled to extend transverse to the vertical center leg 15. Air gap 32 is provided between shunt member 22 and vertical side leg 14, and air gap 33 is provided between shunt member 23 and vertical side leg 16. A shunt member 20 is comprised of a third set of I laminations which are butt joined to the portion 14c, 14d of the vertical side leg 14 which are located below the center transverse leg 12. The laminations of shunt member 20 are assembled to extend transverse to vertical side leg 17. A fourth shunt member 21 comprised of a set of I laminations is butt joined to the portion 16c, 16d of the vertical side leg which is located below the center transverse leg 12. The laminations of shunt member 21 extend transversely to vertical side leg 16. An air gap 30 is provided between shunt member 20 and the lower portion 15c, 15d of center leg 15, and an air gap 31 is provided between laminations 21 and the lower portion 15c, 15d of center leg 15.

Three primary windings 24, 25, 26 are wound on vertical center leg 15, vertical side leg 14, and vertical side leg 16 respectively. Primary winding 24 which has terminals 58, 59 is wound on portion 15a of vertical center leg 15 between the shunt members 22, 23 and the center transverse leg 12; primary winding 25 which has terminals 62, 63 is wound on the portion 14c of vertical side leg 14 between the center transverse leg 12 and the shunt member 20; and primary winding 26 which has terminals 66, 67 is wound on the portion 16c of the vertical side leg 16 between the center transverse leg 12 and the shunt member 21.

Three secondary windings 27, 28, 29 are wound on vertical legs 15, 14 and 16 respectively. Secondary winding 27 which has terminals 60, 61 and a tap 36 is wound on the portion 15b of vertical center leg 15 between upper transverse leg 11 and shunt members 22, 23; secondary winding 28 which has terminals 64, 65 and a tap 34 is wound on vertical side leg 14 between lower leg 13 and shunt member 20; and secondary winding 29 which has terminals 68, 69 and tap 35 is wound on vertical side leg 16 between lower leg 13 and shunt lamination 21.

It will be seen, therefore, that shunt member 20 is disposed between primary winding 25 and secondary winding 28 on vertical side leg 14; shunt member 21 is disposed between primary winding 26 and secondary winding 29 on vertical side leg 16; and shunt members 22 and 23 are disposed between primary winding 24 and secondary winding 27 on vertical center leg 15.

In order to maintain the proper magnetic flux density in each section of core 10 a predetermined relationship must be maintained between the cross-sectional dimensions of the legs of the core 10. Thus, the cross-sectional area of the laminations in the portions 14c, 14d, 15c, 15d, 16c, 16d of each of the vertical legs 14, 15, 16 and the lower transverse leg 13 must be equal to or greater than the cross-sectional area of the laminations in the portion 15a, 15b of the center leg 15.

In a similar manner the cross-sectional area of the portion of the laminations in the portions 14a, 14b, 16a, 16b of vertical side legs 14, 16 and the cross-sectional area of the laminations in the upper leg 11 must be equal to or greater than one-half the cross-sectional area of the portion 15a, 15b of center leg 15, and the cross-sectional area of transverse center leg 12 must be equal to or greater than .866 times the cross-sectional area of the laminations in the portion 15a, 15b of the vertical center leg 15.

FIG. 1a shows sets of standard E, I laminations which may be used to provide a core 10 having the configuration shown in FIG. 1. The laminations may be stamped from 29 gauge, grain oriented, silicon steel. As shown in FIG. 1a, successive layers of the core are oriented relative to each other. One layer 40 may comprise a first E-shaped member 42 having its open end butt joined to the back end of a second E-shaped member 43 and an I-shaped member 44 which has its long dimension in spanning relation with an butt joined to the open end of the second E-shaped member 43. Layer 41 shown to the right of layer 40 has members 42, 43 of the same configuration as those in layer 40. However, the entire layer 41 as assembled is oriented 180° relative to the layer 40. Thus an assembled core 10 is made up of alternate layers 40 and 41 stacked in superposed relation until the desired thickness is attained.

FIG. 1b comprises a schematic representation of a transformer having the core configuration of FIG. 1, and illustrates representative connections of the core windings to the input and output terminals of the device in its use to provide a regulated D.C. output voltage to a load from a three-phase A.C. input line voltage.

The windings of FIG. 1b are identified with the same numbers as used in FIG. 1 to show the correspondence of the circuit components with the structure shown in FIG. 1. The three-phase power source 53 may comprise a commercially available 220 volt, 60 Hz. supply. In the present exemplary connections, the input terminals 58, 59, 62, 63, 66, 67 of the three primary windings 24, 25, 26 on the single core transformer 10 are shown connected in a delta configuration. Primary windings 24, 25, 26 are connected to the three-phase source 53 in such fashion that when the instantaneous values of the magnetic fluxes produced by currents flowing through these windings are passing through their positive half cycles, the magnetic fluxes in legs 15a, 14c and 16c will all be either in an upward direction or will all be in a downward direction. Such manner of connection results in the smallest resultant flux flowing in magnetic members 12 and 15c, 15d (FIG. 1).

Secondary windings 27, 28, 29 are shown star connected in the present example with taps 34, 35, 36 making up the common connection. Capacitors 50, 51, 52 are connected respectively across secondary windings 27, 28, 29. Secondary windings 27, 28, 29 are shown connected via conductors 54a, 54b, 54c, respectively to a three-phase bridge rectifier 54, the output terminals 57, 58 of which are connected to a variable load resistance having a filter capacitor 55 connected thereacross. Capacitor 50 and winding 27 produce a ferroresonant action in the portion of the magnetic path (15b) which is associated with winding 27 only. Similar ferroresonant actions take place in magnetic pats 14d and 16d, the other two phases of the transformer. The disclosed construction of the transformer is such that these three ferroresonant actions may take place independently of each other so that essentially each phase is acting as an independent entity. By allowing the return fluxes to share the same magnetic path, (i.e., paths 15c, 15d and 12 of FIG. 1) a substantial reduction in size, weight, and cost is achieved while yet providing the desired operating mode.

FIG. 2a is like FIG. 1 and is used to designate the magnetic fluxes in the various segments of the magnetic structure 10 of FIG. 1, and is used in conjunction with the vector diagram of FIG. 2b which is illustrative of the fundamental frequency components of all the magnetic fluxes shown in FIG. 2a for a set of three phase input voltages having positive phase sequence. The fluxes $\varphi 15a$, $\varphi 14c$, and $\varphi 16c$ which are set up by currents flowing in the primary windings are shown in FIG. 2b as vectors located 120 degrees apart in time phase position. Because of structural symmetry, flux $\varphi 14a$ and $\varphi 14b$ will be in phase with $\varphi 15a$ and have a magnitude equal to one half the magnitude of $\varphi 15a$. Flux $\varphi 12a$ will be the vector sum of $\varphi 14a$ and $\varphi 14c$ and will, because of this vector addition, have a magnitude equal to $\sqrt{3/2}$ or 0.866 of the magnitude of $\varphi 15a$. The same magnitude relationship will hold for $\varphi 12b$. Flux $\varphi 15c$ will have a magnitude equal to the magnitude of 15a.

It is well known that in a ferroresonant circuit of the type illustrated in 1b, that under load conditions, the magnetic flux associated wtih the output winding lags the magnetic flux associated with the input winding. This accounts for the flux 15b of FIG. 2b shown lagging the flux 15a by an angle $\alpha$. A similar phase lag $\alpha$ is shown for the other two phases. The remaining fluxes are now determined by vector addition using the direction shown in FIG. 2a. For example, $\varphi 20 = \varphi 14d - \varphi 14c$. The magnitude of $\varphi 15d$ is equal to the magnitude of $\varphi 15b$. The manner of determining the remaining relations will be apparent therefrom.

FIG. 2c is similar to FIG. 2b except that a negative phase sequence of primary fluxes $\varphi 15a$, $\varphi 14c$, and $\varphi 16c$ is assumed. FIG. 2c shows that the magnitudes of all fluxes are unchanged with change in phase sequence; hence the transformer will operate satisfactorily for either phase sequence. FIGS. 2b and 2c also show that members 12 and the lower portions 15c, 15d of member 15 provide a common return path for fluxes associated with two different phases of the three phases present. The magnitude of the resultant flux in paths 12 and 15c, 15d is less than or equal to the magnitude of either individual flux flowing in the common path.

The minimum widths and heights of all magnetic members making up the structure shown in FIG. 1 can be determined from the vector diagrams of FIGS. 2b or 2c. For example, it can be seen that transverse leg 12 of FIG. 1 need only have a height which is 0.866 of the width of member 15. Also member 15c, 15d need only have a width equal to the width of member 15a, 15b. The height of member 11 need only be half the width of member 15 and the widths of members 14 and 16 of FIG. 1 need be only one-half the width of member 15.

FIG. 3 shows a lamination structure in which all member widths or heights have been reduced to the minimum required in accordance with the relationships described above. As there shown, a cruciform construction is provided in such manner that fabrication of the transformer can be simplified. More specifically, the structure of FIG. 3 is made up of U-shaped piece 70 and a cross-shaped piece 71 which are assembled with one another to form a rectangular shaped core having a vertical center leg 73 and a transverse center leg 74 in the manner of the structure of FIG. 1.

More specifically, the U-shaped member 70 comprises a transverse leg 75 and two vertical side legs 76, 77. The lower portion of the vertical side legs 76, 77 have a width "a" which terminates in sections 78, 79, each of which has an arcuate edge which narrows the legs to a width $a/2$.

The center vertical leg 73 has a width "a." The upper end of the center vertical leg is curved convexly to conform to a corresponding concave indentation in transverse side leg 75. The lower end of center vertical leg 73 terminates in a transversely extending base member 72 which has its ends 90, 91 cut at a bias to conform to corresponding bias cuts on the lower ends of the side legs 76, 77. The height of the base member 72 is also "a." The upper edges of the base member 72 which extends between the center vertical leg 73 and the adjacent side legs 76 and 77 are of a length "c."

The transverse center leg 74 has a lower edge extending between vertical center leg 73 and the side legs 76, 77 of dimension "c." The ends of leg 74 are arcuately shaped to conform to the arcuate sides of portion 78, 79 on side legs 76, 77. The upper edges of the transverse center leg 74 extending between the center leg 71 and the side legs 76, 77 have a length of $$c + \frac{a}{2}$$

The vertical dimension of the portions of side legs 76, 77 and vertical leg 73 which extend betwen the center transverse leg 74 and the base leg 72 is "d."

Shunt I-shaped pieces 80, 81 having a thickness $b$ and associated air gaps 84, 85 are provided on the lower portion of legs 76, 77, as shown in FIG. 1. Similarly, shunt-I-shaped pieces 82, 83 having a dimension of $b/2$ and associated gaps 86, 87 are provided for the support portion of center vertical leg 73 as in FIG. 1. The vertical dimension of the portion of the side legs 76, 77 extending between the transverse center leg 74 and the transverse side leg 75 is $$e = \frac{c(d-b)}{c+a/2} + \frac{b}{2}$$

In constructing the transformer using the structure of FIG. 3, the U-shaped piece 70 and the cross-shaped piece 71 are stacked to the required stackup dimension. The primary and secondary windings for the three phases are then placed on the appropriate legs of these two stacks of laminations, and the two assemblies are then press fitted together to form the structure of FIG. 3. The shunt laminations are placed into position to complete the structure.

In one successful embodiment, a transformer of the physical design and construction shown in FIG. 1 was constructed to provide 1500 volts of filtered and regulated D.C. power. Referring to FIG. 1, the stack-up of the laminations which form core 10 comprised 3.5625 inches of EI-1.2, three-phase, grain oriented, 29 gauge silicon steel laminations having alternate layers of the configurations 40, 41 shown in FIG. 1a. Each of the windings 24, 25, and 26 consisted of 182 turns of #16 wire. Each secondary winding 27, 38, 29 consisted of 18 turns of 0.085" x 0.185" conductor from the start to the winding tap, and 330 turns of #19 wire from the winding tap to the finish of the winding. The shunts 20 and 21 each were made up of a ¾ inch stack-up of I pieces, the dimensions of which were 3¾" x 1.172" x 0.014". The shunts 22 and 23 each were made up of a 0.375 inch stackup of I-pieces, the dimensions of which were 3¾" x 1.172" x 0.014". An 8 mfd., 660 v. alternating current capacitor was connected across the 348 turns of each secondary winding as shown in FIG. 1b. Connecting the transformer as shown in FIG. 1b, to a 220 volt, three-phase, 60 Hz. commercial power source with the three-phase bridge rectifier 54 made up of six IW3290R4JA71C diodes, and using an 80,000 mfd. filter capacity 55, the following outputs were provided.

CHART I

| A.C. input voltage, $V_{12}$ (volts) | A.C. input voltage, $V_{23}$ (volts) | A.C. input voltage, $V_{31}$ (volts) | D.C. output voltage, $V_{DC}$ (volts) | D.C. output current, $I_{OC}$ (amps) | Peak to peak output ripple voltage, (mv.) |
|---|---|---|---|---|---|
| 200 | 201 | 200 | 54.8 | 2.00 | 80 |
| 226 | 227 | 227 | 54.8 | 2.00 | 50 |
| 248 | 248 | 248 | 55.2 | 2.05 | 55 |
| 200 | 200 | 200 | 54.2 | 10.50 | 120 |
| 226 | 227 | 226 | 54.2 | 10.50 | 100 |
| 248 | 248 | 249 | 54.2 | 10.50 | 85 |
| 200 | 200 | 200 | 52.3 | 30.00 | 450 |
| 226 | 226 | 226 | 52.9 | 30.20 | 300 |
| 248 | 248 | 248 | 53.0 | 30.35 | 200 |

The first three colums in Chart I give the three line-to-line input voltages obtained by use of voltage varying transformers connected to a 60 cycle commercial source, which voltages were applied to the primary windings of the transformer. The remaining three columns give the D.C. output voltage, D.C. output current, and peak-to-peak ripple voltage as the input line voltage was varied from 200 to 248 volts and the D.C. current was varied from 2.0 to 30.0 amperes.

It is noted that the D.C. output voltage remains very nearly constant with large changes in the input line voltage. With a thirty ampere load, for example, the D.C. output voltage changes only ±0.66% for approximately ±10% change in the input line voltage.

In addition to providing an integral magnetic core structure for providing regulated D.C. power from a three-phase source with improved operating characteristics, the device is further novel in its use of three ferroresonant actions in an integral structure independent of one another.

In certain applications such operational mode may be used to distinct advantage of associated equipment. By way of example, in one type of commercial equipment which is necessarily energized by D.C. voltages obtained from a three-phase source, the collapse characteristic of the ferroresonant action may be used to change the energy storage capacitor which maintains output voltage during monitoring interruptions.

It is further apparent that the provisions of an integral core structure which is operational in such manner results in a substantial reduction in the amount of room which would normally be required for known equipment to provide a related regulated output voltage. In addition, the resultant reduction in size of structure results in a corresponding decrease in the amount of lamination material required and a further saving in cost.

The novel structure also has utility as a three-phase alternating current line regulator and as a pre-regulating transformer in supplying D.C. bulk voltage for series regulator and converter requirements.

I claim:
1. An integral three-phase ferroresonant transformer comprising a magnetic core having a rectangular configuration including a first and a second vertical side leg, an upper transverse leg, a lower transverse leg, a vertical center leg, a transverse center leg, a first primary winding and a first secondary winding located on the portion of said vertical center leg which extends above said transverse center leg, a second primary winding and a second secondary winding located on the portion of said first vertical side leg which extends below said transverse center leg, a third primary winding and a third secondary winding located on the portion of said second vertical side leg which extends below said transverse center leg, and a first shunt member located between said first primary winding and said first secondary winding, a second shunt member located between said second primary winding and said second secondary windings, and a third shunt member located between said third primary winding and said third secondary winding.

2. A transformer as set forth in claim 1 in which said core is comprised of a plurality of layers, each of which layers comprises a first E-shaped member, a second E-shaped member having its closed end abutting the open end of said first E-shaped member, and an I-shaped member abutting and closing the open end of the second E-shaped member.

3. A transformer as set forth in claim 2 in which each layer in said core is oriented 180° relative to its adjacent layers in the core.

4. A transformer as set forth in claim 1 in which each of said shunts is butt joined to an associated vertical leg, and is comprised of a plurality of members stacked to extend transversely of its adjacent leg.

5. A transformer as set forth in claim 1 in which the width of the portions of the vertical side legs located on one side of said transverse center leg, and the height of the transverse side leg on said one side, are equal to or greater than the width of the vertical center leg.

6. A transformer as set forth in claim 1 in which the width of the portion of said first and second vertical side legs which is located above said transverse center leg and the height of the transverse side leg on the same side of the transverse center leg are equal to or greater than one half the width of the vertical center leg.

7. A transformer as set forth in claim 1 in which the height of said center transverse leg is equal to or greater than .866 times the width of the center vertical leg.

8. A transformer as set forth in claim 1 in which the width of the shunts on said first and second vertical legs above said transverse center leg are equal to one half the width of the shunts located below said transverse center leg.

9. A transformer as set forth in claim 1 in which said core is comprised of a U-shaped piece which forms said first and second outside legs and said upper transverse side leg of said rectangular configuration, and a cross-shaped piece having a base which forms said lower transverse side leg of said rectangular configuration, and the vertical and cross pieces of which forms said vertical and transverse center legs.

10. A transformer as set forth in claim 1 in which the portion of said vertical side leg below said transverse center leg has a width of dimension "a" terminating in a center section which narrows to a width $a/2$ for the portion of the side legs which is located above said transverse center leg.

11. A transformer as set forth in claim 10 in which said vertical center leg has a dimension "a" and in which the ends of said transverse center leg are sloped to conform to said center section of said side legs, and in which the lower edges of said transverse center leg extending between said vertical center leg and said side legs is a dimension "c" and the upper edges of said transverse center leg extending between said vertical center leg and said side legs is a dimension $$c+\frac{a}{2}$$

12. A transformer as set forth in claim 1 in which said vertical center leg has a dimension "a," the vertical dimension of the portion of the vertical side legs which is located between the upper edge of said lower transverse leg and the lower edge of said transverse center leg is "d," and the horizontal dimension of the portion of the lower transverse leg which extends between each vertical side leg and the vertical center leg is "c," and in which the vertical dimension of the portion of the side legs which extend between the upper edge of the transverse center leg and the lower edge of the upper transverse leg is $$e=\frac{c(d-b)}{c+a/2}+\frac{b}{2}$$

13. A transformer as set forth in claim 1 which includes means for connecting said primary windings to different phases of a three-phase source, and in which at least certain of the return flux produced by said windings for at least two phases share the same magnetic path on said core.

14. A transformer as set forth in claim 13 in which said common magnetic path extends over at least portions of said transverse center leg and a portion of said vertical center leg.

15. A transformer as set forth in claim 1 which includes means for connecting each of said primary windings to a different phase of a three-phase A.C. source, and three-phase rectifier means connected to said secondary windings to provide a regulated D.C. output voltage to a load.

16. An integral three-phase ferroresonant transformer comprising a magnetic core having a rectangular configuration including a first and a second vertical side leg, an upper transverse leg, a lower transverse leg, a vertical center leg, a transverse center leg, a first primary winding and a first secondary winding located on the portion of said vertical center leg which extends above said transverse center leg, a second primary winding and a second secondary winding located on the portion of said first vertical side leg which extends below said transverse center leg, a third primary winding and a third secondary winding located on the portion of said second vertical side leg which extends below said transverse center leg, shunt means for each set of said primary and secondary windings, and means for connecting said primary windings to different phases of a multiphase source, certain legs of said core providing a common path for at least two phases of the multiphase fluxes provided in said core.

References Cited

UNITED STATES PATENTS

| | | | |
|---|---|---|---|
| 1,342,995 | 6/1920 | Frank | 336—215 XR |
| 1,614,161 | 1/1927 | Stahl | 336—5 |
| 2,497,499 | 2/1950 | Hedding | 336—155 XR |
| 3,129,383 | 4/1964 | Karo | 336—160 |
| 3,427,527 | 2/1969 | Christensen et al. | 336—5 XR |

FOREIGN PATENTS

| | | |
|---|---|---|
| 106,314 | 8/1924 | Switzerland. |
| 355,210 | 8/1961 | Switzerland. |
| 760,935 | 11/1956 | Great Britain. |

WILLIAM M. SHOOP, JR., Primary Examiner

U.S. Cl. X.R.

336—5, 160, 215